US007019617B2

(12) United States Patent
Pratt et al.

(10) Patent No.: US 7,019,617 B2
(45) Date of Patent: Mar. 28, 2006

(54) RADIO FREQUENCY IDENTIFICATION DEVICES, BACKSCATTER COMMUNICATION DEVICE WAKE-UP METHODS, COMMUNICATION DEVICE WAKE-UP METHODS AND A RADIO FREQUENCY IDENTIFICATION DEVICE WAKE-UP METHOD

(75) Inventors: Richard M. Pratt, Richland, WA (US); Michael A. Hughes, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 315 days.

(21) Appl. No.: 10/263,940

(22) Filed: Oct. 2, 2002

(65) Prior Publication Data

US 2004/0198233 A1 Oct. 7, 2004

(51) Int. Cl.
*H04B 1/38* (2006.01)
*H04B 1/16* (2006.01)
*H04M 1/00* (2006.01)

(52) U.S. Cl. ............... 340/10.1; 455/343.2; 455/574; 340/10.33; 340/572.1

(58) Field of Classification Search ...... 455/41.1–41.2, 455/151.1, 343.2, 343.3, 574, 550.1; 340/10.1, 340/10.33, 10.3, 10.4, 10.5, 572.1
See application file for complete search history.

(56) References Cited

U.S. PATENT DOCUMENTS

| | | | |
|---|---|---|---|
| 4,075,632 A | 2/1978 | Baldwin et al. | 343/6.8 |
| 4,352,183 A | 9/1982 | Davis et al. | 371/33 |
| 4,360,810 A | 11/1982 | Landt | 343/6.5 |
| 5,521,601 A | 5/1996 | Kandlur et al. | 342/44 |
| 5,530,702 A | 6/1996 | Palmer et al. | 370/85.3 |
| 5,550,547 A | 8/1996 | Chan et al. | 342/42 |
| 5,790,946 A | 8/1998 | Rotzoll | 455/343 |
| 5,850,187 A | 12/1998 | Carrender et al. | 340/10.6 |
| 5,883,582 A | 3/1999 | Bowers et al. | 340/825.54 |
| 5,929,779 A * | 7/1999 | MacLellan et al. | 340/10.2 |
| 5,973,611 A * | 10/1999 | Kulha et al. | 340/5.62 |

(Continued)

FOREIGN PATENT DOCUMENTS

EP 0 766 215 A1 4/1997

(Continued)

OTHER PUBLICATIONS

U.S. Appl. No. 09/589,001, filed Jun. 6, 2000, R. W. Gilbert et al.

(Continued)

*Primary Examiner*—Simon Nguyen
(74) *Attorney, Agent, or Firm*—Wells St. John, P.S.

(57) ABSTRACT

Radio frequency identification devices, backscatter communication device wake-up methods, communication device wake-up methods and a radio frequency identification device wake-up method are described. In one aspect, a wireless communication device includes a processor configured to process a plurality of received wireless signals and to control the communication of a plurality of outputted wireless signals, wherein the processor is configured to control the communication of the outputted wireless signals using backscatter modulation, circuitry coupled with the processor and configured to control operations of the processor, and wherein the processor is configured to output a reference signal responsive to detection of radio frequency energy, the circuitry is configured to analyze the reference signal and the radio frequency energy, and the processor is configured to enter a predefined mode of operation utilizing an increased amount of electrical energy responsive to the analysis of the reference signal and the radio frequency energy by the circuitry.

11 Claims, 3 Drawing Sheets

U.S. PATENT DOCUMENTS

| | | | |
|---|---|---|---|
| 5,986,570 A | 11/1999 | Black et al. ............ | 340/825.54 |
| 6,091,319 A | 7/2000 | Black et al. ............... | 340/10.2 |
| 6,130,623 A | 10/2000 | MacLellan et al. .... | 340/825.54 |
| 6,177,861 B1 | 1/2001 | MacLellan et al. ........ | 340/10.1 |
| 6,198,392 B1 | 3/2001 | Hahn et al. | |
| 6,198,913 B1 | 3/2001 | Sung-Bin et al. | |
| 6,265,962 B1 | 7/2001 | Black et al. ............... | 340/10.2 |
| 6,294,953 B1 | 9/2001 | Steeves ..................... | 329/341 |
| 6,307,848 B1 | 10/2001 | Wood, Jr. ................... | 370/329 |
| 6,366,260 B1 | 4/2002 | Carrender ................... | 343/866 |
| 6,525,648 B1* | 2/2003 | Kubler et al. ............ | 340/10.33 |
| 6,590,758 B1* | 7/2003 | Friede et al. ............... | 361/170 |
| 6,593,845 B1* | 7/2003 | Friedman et al. ........ | 340/10.33 |
| 6,661,336 B1* | 12/2003 | Atkins et al. .............. | 340/10.2 |
| 6,760,578 B1* | 7/2004 | Rotzoll .................... | 455/343.2 |
| 6,812,824 B1* | 11/2004 | Goldinger et al. ......... | 340/10.1 |
| 6,831,561 B1* | 12/2004 | Hahn et al. ............... | 340/572.4 |
| 6,836,472 B1* | 12/2004 | O'Toole et al. ............. | 370/335 |
| 2001/0001553 A1 | 5/2001 | Hahn et al. | |
| 2003/0104848 A1* | 6/2003 | Brideglall ................... | 455/574 |

FOREIGN PATENT DOCUMENTS

GB          2369963          6/2002

OTHER PUBLICATIONS

U.S. Appl. No. 09/802,408, filed Mar. 9, 2001, R. W. Gilbert et al.
U.S. Appl. No. 09/833,465, filed Apr. 11, 2001, C. L. Carrender et al.
U.S. Appl. No. 09/588,997, filed Jun. 6, 2000, R. W. Gilbert et al.
U.S. Appl. No. 09/589,000, filed Jun. 6, 2000, R. W. Gilbert et al.
U.S. Appl. No. 09/588,998, filed Jun. 6, 2000, C. L. Carrender et al.
U.S. Appl. No. 09/797,539, filed Feb. 28, 2001, C. L. Carrender.
U.S. Appl. No. 09/833,391, filed Apr. 11, 2001, C. L. Carrender.
Finkenzeller, Klaus, "Radio-Frequency identification Fundamentals and Applications", *RFID HANDBOOK*, Chapter 8, pp. 151-158 (Jan. 2002).
International Standard, ISO/IEC, "Part 2: Mechanisms Using Symmetry Encipherment Algorithms", *Information Technology—Security Techniques—Entity Authentication*, #ISO/IEC 9798-2:1999(E), 2nd Ed., pp 1-11 (Jul. 15, 1999).
Agilent Technologies, "Schottky Diode Voltage Doubler, Application Note 956-4", 2 pages (1999).
U.S. Patent Appn. filed Oct. 2, 2002, entitled "RFID System and Method Including Tag ID Compression", Michael A. Hughes and Richard M. Pratt.
U.S. Patent Appn. filed Oct. 2, 2002, entitled "Wireless Communication Systems, Radio Frequency Identification Devices, Methods of Enhancing a Communications Range of a Radio Frequency Identification Device, and Wireless Communication Methods", by Richard M. Pratt and Steven B. Thompson.
U.S. Patent Appn. filed Oct. 2, 2002, entitled "Wireless Communications Devices, Methods of Processing a Wireless Communication Signal, Wireless Communication Synchronization Methods and a Radio Frequency Identification Device Communication Method", by Richard M. Pratt and Steven B. Thompson.
U.S. Patent Appn. filed Oct. 2, 2002, entitled "Wireless Communications Systems, Radio Frequency Identification Devices, Wireless Communications Methods, and Radio Frequency Identification Device Communtications Methods", by Richard M. Pratt and Steven B. Thompson.
U.S. Patent Appn. filed Oct. 2, 2002, entitled "A Challenge-Based Tag Authentication Model", by Michael A. Hughes and Richard M. Pratt.
U.S. Patent Appn. filed Oct. 2, 2002, entitled "Method of Simultaneously Reading Multiple Radio Frequency Tags, RF Tag, and RF Reader", by Emre Ertin, Richard M. Pratt, Michael A. Hughes, Kevin L. Priddy and Wayne M. Lechelt.
U.S. Patent Appn. filed Oct. 2, 2002, entitled "Radio Frequency Identification Device Communications Systems, Wireless Communication Devices, Wireless Communication Systems, Backscatter Communication Methods, Radio Frequency Identification Device Communication Methods and a Radio Frequency Identification Device", by Michael A. Hughes and Richard M. Pratt.
U.S. Patent Appn. filed Oct. 2, 2002, entitled " System and Method to Identify Multiple RFID Tags", by Michael A. Hughes and Richard M. Pratt.

* cited by examiner

RADIO FREQUENCY IDENTIFICATION DEVICES, BACKSCATTER COMMUNICATION DEVICE WAKE-UP METHODS, COMMUNICATION DEVICE WAKE-UP METHODS AND A RADIO FREQUENCY IDENTIFICATION DEVICE WAKE-UP METHOD

GOVERNMENT RIGHTS STATEMENT

This invention was made with Government support under Contract 43213A awarded by the U.S. Department of Navy. The Government has certain rights in the invention.

TECHNICAL FIELD

The present invention relates to radio frequency identification devices, backscatter communication device wake-up methods, communication device wake-up methods and a radio frequency identification device wake-up method.

BACKGROUND OF THE INVENTION

Remote wireless communications may be implemented using radio frequency (RF) technology. Exemplary applications utilizing RF technology include identification applications including, for example, locating, identifying, and tracking of objects. Radio frequency identification device (RFID) systems have been developed to facilitate identification operations. For example, one device may be arranged to output and receive radio frequency communications and one or more remotely located device may be configured to communicate with the one device using the radio frequency communications. The remotely located device(s) may be referred to as a tag, while the other device may be referred to as a reader. Some advantages of radio frequency communications of exemplary radio frequency identification device systems include abilities to communicate without contact or line-of-sight, at relatively fast speeds, and with robust communication channels.

Some remote device configurations are arranged to utilize electrical energy from a source resident upon the device itself including, for example, a battery. Some of these remote device configurations may operate in a plurality of different states wherein different amounts of electrical energy are utilized by the device. In one possible implementation, the device may typically operate in a given state wherein a minimal amount of electrical energy is utilized, and another state wherein an increased amount of electrical energy is utilized by the device to process received communications and implement external communications.

Aspects of the present invention described below provide exemplary methods and apparatuses arranged to reduce the consumption of electrical energy of a wireless communication device.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Attention is directed to the following commonly assigned applications, which are incorporated herein by reference: U.S. patent application Ser. No. 10/263,826 entitled "Radio Frequency Identification Device Communications Systems, Wireless Communication Devices, Backscatter Communication Methods and Radio Frequency Identification Device Communication Methods," by inventors Mike A. Hughes and Richard M. Pratt; U.S. patent application Ser. No. 10/263,809, entitled "Method of Simultaneously Reading Multiple Radio Frequency Tags, RF Tag, and RF Reader," by inventors Emre Ertin, Richard M. Pratt, Mike A. Hughes, Kevin L. Priddy, and Wayne M. Lechelt; U.S. patent application Ser. No. 10/263,873, entitled "RFID System and Method Including Tag ID Compression," by inventors Richard M. Pratt and Mike A. Hughes; U.S. patent application Ser. No. 10/264,078, entitled "System and Method to Identify Multiple RF Tags," by inventors Mike A. Hughes and Richard M. Pratt; U.S. patent application Ser. No. 10/263,997, entitled "Wireless Communication Systems, Radio Frequency Identification Devices, Methods of Enhancing a Communications Range of a Radio Identification Frequency Device, and Wireless Communication Methods," by inventors Richard Pratt and Steven B. Thompson; U.S. patent application Ser. No. 10/263,670, entitled "Wireless Communications Devices, Methods of Processing a Wireless Communication Signal, Wireless Communication Synchronization Methods and a Radio Frequency Identification Device Communication Method," by inventors Richard M. Pratt and Steven B. Thompson; U.S. patent application Ser. No. 10/263,656, entitled "Wireless Communications Systems, Radio Frequency Identification Devices, Wireless Communications Methods, and Radio Frequency Identification Device Communications Methods," by inventors Richard Pratt and Steven B. Thompson; U.S. patent application Ser. No. 10/263,635, entitled "A Challenged-Based Tag Authentication Model," by inventors Mike A. Hughes and Richard M. Pratt; U.S. patent application Ser. No. 09/589,001, filed Jun. 6, 2000, entitled "Remote Communication System and Method," by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System," by inventors R. W. Gilbert, G. A. Anderson, and K. D. Steele; U.S. patent application Ser. No. 09/833,465, filed Apr. 11, 2001, entitled "System and Method for Controlling Remote Device," by inventors C. L. Carrender, R. W. Gilbert, J. W. Scott, and D. Clark; U.S. patent application Ser. No. 09/588,997, filed Jun. 6, 2000, entitled "Phase Modulation in RF Tag," by inventors R. W. Gilbert and C. L. Carrender; U.S. patent application Ser. No. 09/589,000, filed Jun. 6, 2000, entitled "Multi-Frequency Communication System and Method," by inventors R. W. Gilbert and C. L. Carrender; U.S. patent application Ser. No. 09/588,998; filed Jun. 6, 2000, entitled "Distance/Ranging by Determination of RF Phase Delta," by inventor C. L. Carrender; U.S. patent application Ser. No. 09/797,539, filed Feb. 28, 2001, entitled "Antenna Matching Circuit," by inventor C. L. Carrender; U.S. patent application Ser. No. 09/833,391, filed Apr. 11, 2001, entitled "Frequency Hopping RFID Reader," by inventor C. L. Carrender.

According to one aspect of the invention, a wireless communication device comprises a processor configured to process a plurality of received wireless signals and to control the communication of a plurality of outputted wireless signals, wherein the processor is configured to control the communication of the outputted wireless signals using backscatter modulation, circuitry coupled with the processor and configured to control operations of the processor, and wherein the processor is configured to output a reference signal responsive to detection of radio frequency energy, the circuitry is configured to analyze the reference signal and the radio frequency energy, and the processor is configured to enter a predefined mode of operation utilizing an increased amount of electrical energy responsive to the analysis of the reference signal and the radio frequency energy by the circuitry.

According to another aspect of the invention, a radio frequency identification device comprises radio frequency identification device communication circuitry configured to receive a plurality of first wireless communication signals from a reader, to process the first wireless communication signals, and to control the communication of a plurality of second wireless communication signals to the reader responsive to the processing of the first wireless communication signals; and wake-up circuitry configured to receive electrical energy corresponding to radio frequency energy received within the radio frequency identification device, to analyze the received electrical energy with respect to a reference signal, and to output a wake-up signal to the communication circuitry responsive to the analysis.

According to another aspect of the invention, a backscatter communication device wake-up method comprises providing a backscatter communication device, detecting reception of radio frequency energy within the backscatter communication device, generating a reference signal responsive to the detecting using the backscatter communication device, analyzing the radio frequency energy with respect to the reference signal using the backscatter communication device and changing a mode of operation of the backscatter communication device responsive to the analyzing, wherein the backscatter communication device consumes an increased amount of electrical energy after the changing.

According to another aspect of the invention, a communication device wake-up method comprises providing a communication device comprising a processor, providing the processor in a first mode of operation utilizing a first amount of electrical energy, detecting the presence of radio frequency energy, providing the processor in a second mode of operation to generate a reference signal responsive to the detecting, the processor utilizing a second amount of electrical energy greater than the first amount during the second mode of operation, analyzing the radio frequency energy with respect to the reference signal and providing the processor in a third mode operation responsive to the analyzing, the processor utilizing a third amount of electrical energy greater than the second amount during the third mode of operation.

According to yet another aspect of the invention, a radio frequency identification device wake-up method comprises providing a radio frequency identification communication device comprising a processor and wake-up circuitry, the communication device being configured to communicate with a reader, providing the processor in a first mode of operation utilizing a first amount of electrical energy, detecting the presence of radio frequency energy, providing the processor in a second mode of operation responsive to the detecting including generating a clock signal having a frequency corresponding to a frequency of modulation of first wireless signals outputted from the reader, providing operational electrical energy to the wake-up circuitry, and enabling a watchdog timer, the processor utilizing a second amount of electrical energy greater than the first amount during the second mode of operation, comparing a frequency of the radio frequency energy with a frequency of the clock signal, generating an indication signal responsive to the comparing and indicating reception of the radio frequency energy having the frequency of modulation of the first wireless signals outputted from the reader and providing the processor in a third mode operation responsive to the generating including processing the first wireless signals and backscatter modulating received radio frequency energy to communicate second wireless signals to the reader, the processor utilizing a third amount of electrical energy greater than the second amount during the third mode of operation.

Figure 1:
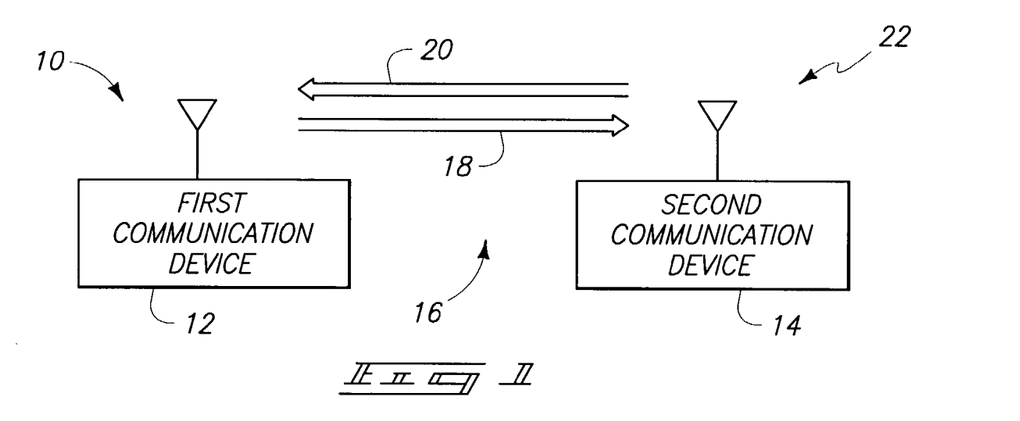
FIG. 1 is functional block diagram of an exemplary wireless communication system.

Referring to FIG. 1, an exemplary wireless communications system 10 is depicted. The exemplary system 10 includes a first communication device 12 and a second communication device 14. The depicted system 10 including a single device 12 and a single device 14 is illustrative and additional communication devices are typically provided in other system configurations.

First and second communication devices 12, 14 are arranged to implement wireless communications 16 in the depicted exemplary embodiment. Possible wireless communications 16 include first wireless signals 18 communicated from first communication device 12 and second communication signals 20 communicated from second communication device 14.

As mentioned above, system 10 is provided to illustrate exemplary structural and method aspects of the present invention. In one possible implementation, system 10 is implemented as a radio frequency identification device (RFID) communications system. For example, in such an arrangement, first communication device 12 may be implemented as a reader, and second communication device 14 may be implemented as a transponder, such as an RFID tag. In one possible RFID system 10, one device 12 is configured to communicate with a plurality of devices 14.

Wireless signals 18 may be referred to as forward link wireless signals and wireless signals 20 may be referred to as return link wireless signals typically communicated responsive to forward link wireless signals 18. Exemplary wireless communications 16 include electromagnetic communication signals, such as radio frequency signals. Alternatively, wireless communications 16 may comprise infrared signals, acoustic signals, or any other appropriate wireless signals capable of being communicated between devices 12, 14.

FIG. 1 also depicts spurious wireless signals 22 which are present in the surrounding area of system 10. Spurious signals 22 refer to electromagnetic or other energy present in the location of system 10 and may include noise or interference. Exemplary spurious signals 22 include cellular telephone communications, microwave ovens, and/or other sources of energy which may be proximately located to system 10.

Figure 2:
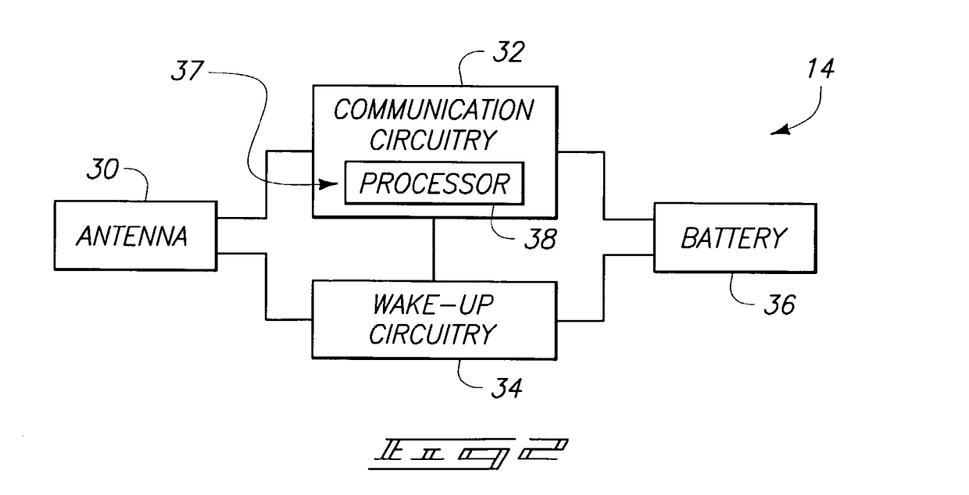
FIG. 2 is a functional block diagram of components of an exemplary wireless communication device of the system.

Referring to FIG. 2, an exemplary arrangement of second communication device 14 is shown. The exemplary configuration of device 14 includes an antenna 30, communication circuitry 32, wake-up circuitry 34 and a battery 36. The illustrated arrangement of second communication device 14 including battery 36 is typically implemented in a semi-passive configuration or active device configuration.

In semi-passive implementations, battery 36 is utilized to provide electrical energy to communication circuitry 32 and wake-up circuitry 34 to implement processing of wireless signals 18 while electromagnetic energy received within device 14 is utilized to generate wireless signals 20.

For active implementations, battery 36 is utilized to provide operational electrical energy to communication circuitry 32 and wake-up circuitry 34. In addition, electrical energy of battery 36 may also be utilized to generate radio frequency energy for communication of signals 20.

Device 14 may also be implemented in a passive configuration. For passive implementations of device 14, received electromagnetic energy is utilized to provide operational electrical energy to components of device 14, as well as provide radio frequency energy for communicating wireless signals 20. In such an implementation, battery 36 may be omitted.

It may be desired to conserve electrical energy of battery 36 in order to extend the useful, operational life of battery 36. In one embodiment, communication device 14 including communication circuitry 32 is arranged to operate in a plurality of operational modes, including for example, first, second and third different operational modes in one embodiment. The operational modes (also referred to as modes of operation) have different power requirements and utilize electrical energy of battery 36 at different rates.

In the illustrated exemplary configuration, communication circuitry 32 includes processing circuitry 37 for controlling operations of device 14. Different circuitry of processing circuitry 37 and/or device 14 may be activated and/or utilized during the different modes of operation which may result in different rates of consumption of electrical energy. An exemplary configuration of processing circuitry 37 includes a processor 38. Processor 38 may be implemented as a model number MSP430F1121 available from Texas Instruments, Inc. Other configurations of processing circuitry 37 (e.g., embedded circuitry) are possible.

During a first operational mode, a minimum amount of electrical energy is utilized by components of device 14. The first mode of operation may be referred to as a sleep mode of operation. In one aspect, device 14 is provided in the first mode of operation in the absence of wireless communications 16.

During a second mode of operation, an increased amount of electrical energy (compared with the first mode of operation) is utilized. The second mode of operation may be referred to as an intermediate mode of operation. Device 14 may be arranged to perform additional operations or functions compared with operations performed during the first mode. For example, and as described below, a reference signal may be generated in the second mode, a watchdog timer may be enabled, and/or wake-up circuitry 34 may be energized.

Aspects of the invention also provide a third mode of operation of device 14 wherein electrical energy is consumed by components of device 14 at an increased rate compared with consumption during the first and second operational modes. For example, device 14 is arranged to process received wireless signals 18 and/or communicate wireless signals 20 during the third mode of operation.

Antenna 30 is arranged to receive electromagnetic energy including signals 18 and to output electromagnetic energy including signals 20. Antenna 30 may comprise a single antenna for communication of signals 18, 20 or include a plurality of respective dedicated antennas for communication of signals 18, 20.

Processor 38 of communication circuitry 32 is configured to execute instructions to control communication operations and other operations of device 14. For example, processor 38 of communication circuitry 32 is arranged to process received wireless signals 18 and to control communication of outputted wireless signals 20. In one arrangement, processor 38 is configured to control antenna 30 to generate wireless signals 20 using backscatter modulation communication techniques. Communication circuitry 32 may control outputting of wireless signals 20 using backscatter modulation according to at least one radio frequency identification device communications protocol.

For example, communication circuitry 32 controls electrical characteristics of antenna 30 according to one backscatter embodiment. Processor 38 may provide a modulation signal to alter electrical characteristics of antenna 30 wherein electromagnetic energy is selectively reflected by antenna 30. Antenna 30 reflects electromagnetic energy creating wireless signals 20 responsive to the modulated signal according to one exemplary backscatter implementation.

The modulated signal may be encoded with information to be communicated from device 14 to device 12. Exemplary information includes identification information, such as a unique serial number which identifies the communicating device 14, or any other desired information to be communicated. According to one exemplary arrangement, communication devices 12, 14 are configured to communicate wireless signals 18, 20 using on/off key (OOK) modulation, such as a FM0 or FM1 encoding scheme. Other modulation techniques or protocols may be utilized to communicate information between devices 12, 14.

Communication circuitry 32 arranged to implement RFID communications may be referred to as radio frequency identification device communication circuitry. Communication circuitry 32 may be operable to control communication of wireless signals 20 responsive to processing of one or more wireless signal 18. For example, circuitry 32 may implement transponder communications in one exemplary embodiment.

Processing of received signals 18 may include extracting an identifier from the wireless signals 18 (e.g., an identifier of the communicating device 12 and/or device 14) and processing of commands within signals 18. Responsive to the processing, device 14 may selectively output or communicate wireless signals 20 including identification information or other desired information requested by first communication device 12.

Wake-up circuitry 34 is coupled with communication circuitry 32 and processor 38 therein and is configured to control one or more operation of communication circuitry 32 and/or processor 38. In at least one embodiment, wake-up circuitry 34 is arranged to control operations of communication circuitry 32 and/or processor 38 in the plurality of operational modes.

Battery 36 is arranged to provide electrical energy to components of device 14. As mentioned above, battery 36 may be omitted in some configurations and other power sources, such as received radio frequency energy, may be utilized.

Figure 3:
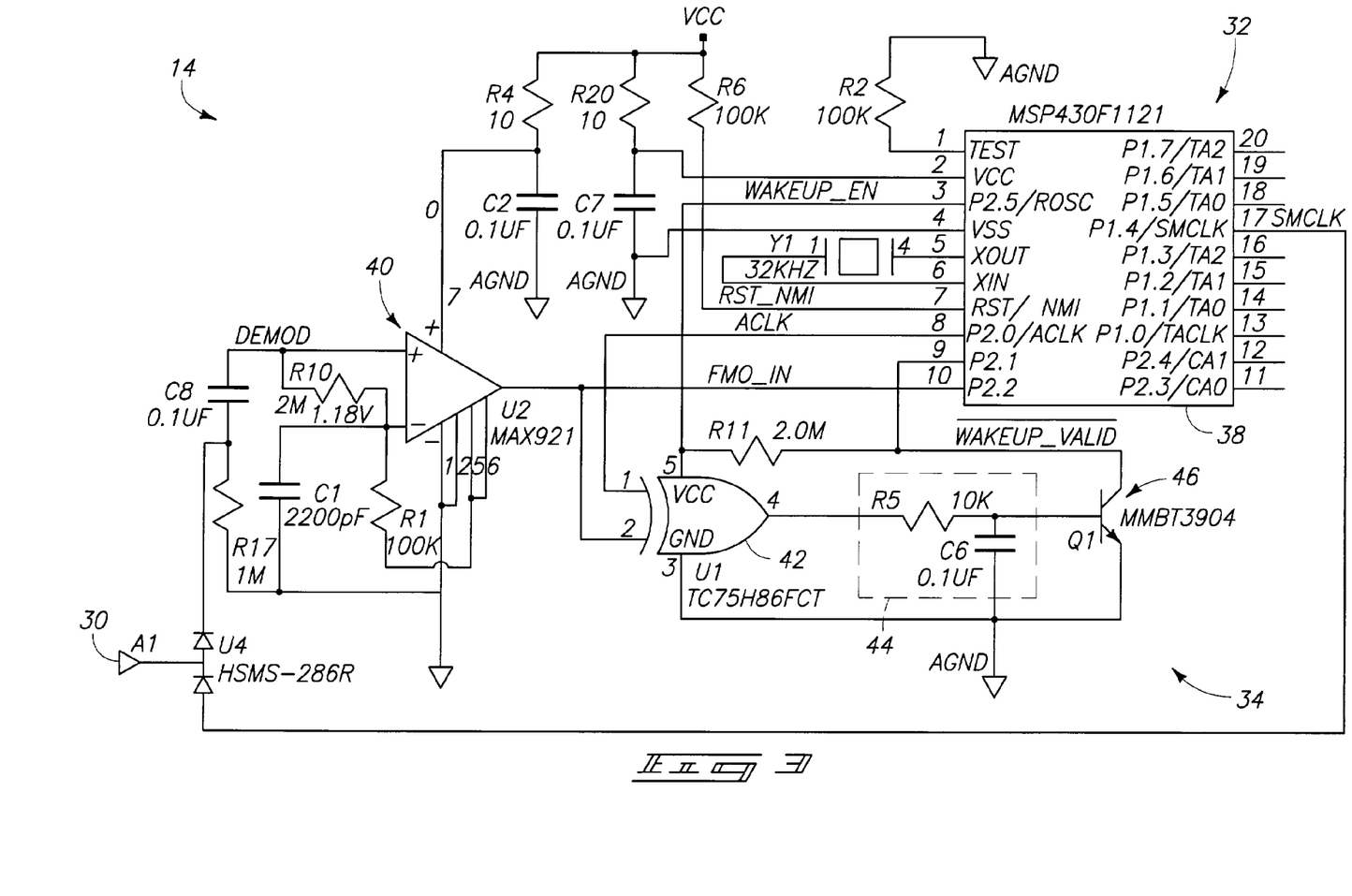
FIG. 3 is a schematic representation of components depicted in FIG. 2 according to one exemplary configuration.

Referring to FIG. 3, exemplary circuitry of communication device 14 is shown. The depicted circuitry of FIG. 3 illustrates exemplary configurations of antenna 30, communication circuitry 32, processor 38 and wake-up circuitry 34.

Battery 36 (not shown in FIG. 3) may be coupled with the illustrated VCC terminals and AGND terminals. The depicted exemplary circuitry of FIG. 3 is provided to illustrate possible methodologies and structures which may be utilized to implement aspects of the present invention. Other alternative arrangements and methods are possible.

At moments in time wherein communication device 14 is not actively receiving wireless signals 18 or outputting wireless signals 20, device 14 and processor 38 may be provided in a first (i.e., sleep) mode of operation to reduce the consumption of electrical energy (e.g., from the battery). During the described first mode, processor 38 is provided in a reduced power consumption state wherein portions of internal circuitry of processor 38 may be deactivated to minimize energy consumption.

Accordingly, in at least one configuration, processing and outputting of wireless signals are not implemented using device 12 during the first mode of operation. However, circuitry of device 14 is arranged to detect the presence of radio frequency energy during the first mode of operation.

For example, the depicted device 14 includes a comparator 40 coupled with antenna 30 and arranged to receive electrical energy from antenna 30 corresponding to radio frequency energy received using antenna 30. As shown in the illustrated embodiment, antenna 30 is coupled with a plurality of diodes which operate to rectify electrical energy corresponding to the received radio frequency energy. The electrical energy received within comparator 40 from antenna 30 corresponds to a modulation signal of device 12.

Comparator 40 is configured to compare received radio frequency energy in the form of demodulated electrical energy with a reference. The reference may be selected to reject numerous types of spurious signals and to indicate reception of radio frequency energy which more closely resembles radio frequency energy outputted from device 12. Responsive to sufficient electrical energy being received within comparator 40 (e.g., a transition occurring in electrical energy from the antenna 30), the signal (FM0_IN) changes state which is received by processor 38.

Device 14 and processor 38 are arranged to enter another operational mode (e.g., second operational mode) and consume an additional amount of electrical energy compared with the consumption during the first mode operation responsive to the change of state of the FM0_IN signal. During such second operational mode, processor 38 is arranged to output a reference signal responsive to the detection of received radio frequency energy as indicated by comparator 40. In one arrangement, processor 38 is arranged to provide the reference signal comprising a clock signal. In the exemplary configuration of FIG. 3, an exemplary reference signal comprising a clock signal is indicated as ACLK. In one arrangement, the reference signal has a frequency corresponding (e.g., substantially equal) to a frequency of modulation of wireless signals 18. An exemplary frequency of the clock signal is 4 kHz.

In addition, processor 38 is arranged to assert a signal WAKEUP_EN responsive to the radio frequency energy received via antenna 30 as indicated by comparator 40. Assertion of the WAKEUP_EN signal, provides operational electrical energy to additional circuitry of device 14 including, for example, wake-up circuitry 34. According to additional aspects, processor 38 enables pin 9 to accept an interrupt and/or enables an internal watchdog timer during the second operational mode. As described further below, processor 38 is arranged to monitor for the reception of an indication signal via pin 9. The processor 38 may operate in a lowest power state that sustains enabled operations during the second operational mode.

As described above in the exemplary embodiment, upon reception of an appropriate signal using pin 10 of processor 38, communication circuitry 32 is configured to provide device 12 in the second operational mode responsive to a sufficient transition in electrical energy from antenna 30 as determined by comparator 40.

The watchdog timer may be utilized to conserve electrical energy of device 14 during the second mode of operation. If the watchdog timer times out, processor 38 returns to an operational mode having a lower power state wherein less electrical energy is consumed within device 14 (e.g., the sleep mode of operation). For example, processor 38 disables the WAKEUP_EN signal which de-energizes wake-up circuitry 34, disables internal circuitry configured to implement watchdog timer operations, disables ACLK, and/or disables interrupt monitoring of pin 9.

Processor 38 is arranged to monitor for the reception of signals (e.g., received via pin 9) during the second operational mode. For example, wake-up circuitry 34 is arranged to selectively output an indication signal to pin 9 of processor 38 during the second operational mode. In one configuration, wake-up circuitry 34 is configured to compare a frequency of received electromagnetic (e.g., RF) energy as indicated by the signal outputted from comparator 40 with a frequency of the reference signal. Responsive to the comparison, wake-up circuitry 34 selectively asserts the indication signal, also referred to as a wake-up signal or WAKEUP_VALID signal. In one embodiment, outputting of the indication signal indicates reception of radio frequency energy via antenna 30 which resembles modulated signals outputted from device 12.

In the illustrated exemplary configuration, wake-up circuitry 34 includes an XOR logic device 42, a filter 44, and a transistor 46. In the depicted embodiment, XOR logic device 42 is coupled with comparator 40 and is configured to receive the FM0_IN signal representative of radio frequency energy received via antenna 30. XOR logic device 42 is also coupled with processor 38 and is configured to receive the reference signal.

Filter 44 is coupled intermediate XOR logic device 42 and transistor 46 and is implemented as a low pass filter in the exemplary configuration. Filter 44 is arranged to smooth the output of XOR logic device 42 and selectively trigger transistor 46 responsive to received radio frequency energy via antenna 30 and outputted signals from comparator 40. The output of filter 44 is the frequency difference of the two source signals inputted to device 42 (i.e., beat frequency). If the frequency difference is above a cut-off frequency of filter 44, the output signal has a voltage equal to approximately the mid-point voltage between the supply and ground in the described exemplary configuration. However, the output begins to oscillate at the beat frequency between the ground and supply values if the frequency difference is below the cut-off frequency. The exemplary circuitry 34 utilizes the filtered signal approaching ground to provide processor 38 in the third operational mode to sample the waveform outputted from comparator 40 and which corresponds to received radio frequency energy via antenna 30. Transistor 46 is ON until the filtered output signal is within 600 mV of ground. When the filtered output signal is below 600 mV, transistor 46 is turned OFF causing an indication signal (i.e., WAKEUP_VALID) to go high which is monitored by processor 38 via pin 9.

As described above in accordance with an exemplary implementation, wake-up circuitry 34 is arranged to compare a frequency of received electrical energy (FMO_IN) with respect to a frequency of the reference signal to analyze radio frequency energy received via antenna 30. The output of filter 44 is above a threshold of transistor 46 if the frequency of the reference signal and the frequency of the signal outputted from comparator 40 are sufficiently different and accordingly, transistor 46 is ON. If the frequency of the output of comparator 40 is substantially equal to a frequency of the reference signal outputted from processor 38, the voltage of filter 44 applied to transistor 46 begins to fall. If such voltage falls below a threshold, such as 0.6 Volts, transistor 46 is provided in an OFF state indicating the reception of an appropriate modulated signal via antenna 30 and corresponding to communications from communication device 12. Accordingly, wake-up circuitry 34 including XOR logic device 42 and filter 44 operate to compare a frequency of received radio frequency energy with respect to a frequency of the reference signal outputted from processor 38. Other configurations for obtaining the beat frequency including the utilization of a digital delay line, retriggerable one-shot, band-pass filter, etc. are possible.

In the described exemplary configuration, transistor 46 is arranged to provide device 14 and processor 38 in the third mode of operation having an increased consumption rate of electrical energy responsive to the output of filter 44. During operations in the third operational mode, received signals 18 may be sampled and processed within device 14 and signals 20 may be generated using processor 38. Accordingly, following the assertion of the WAKEUP_VALID signal via transistor 46, communication circuitry 32 is arranged to enter a predefined (e.g., third) mode of operation wherein additional electrical energy is consumed to process first wireless signals 18 received via antenna 30.

According to the illustrated exemplary embodiment, circuitry of device 14 is arranged to analyze received radio frequency energy with respect to a reference signal. Device 14 is arranged to change a mode of operation responsive to the analysis of received radio frequency energy and the reference signal. The analysis of the received radio frequency energy and the reference signal comprises using circuitry external of processor 38 in at least one embodiment. As described herein, processor 38 is arranged to provide operational electrical energy to such external circuitry responsive to the detection of a sufficient radio frequency energy transition received via antenna 30. Such operates to minimize the consumption of electrical energy in the absence of appropriate wireless signals 18.

A watchdog timer may also be enabled during the third operational mode and responsive to the reception of the indication signal. The processor 38 returns operations to a lower power state if communications are not received within processor 38 via pin 10 and/or communications cease for a specified period of time as determined by the watchdog timer.

In the exemplary configuration of FIG. 3, radio frequency energy including communications are received and/or processed using a single receiver of device 14 although other embodiments are possible. The implementation of a single receiver reduces the number of components utilized to implement wake-up functions as well as communications.

Figure 4:
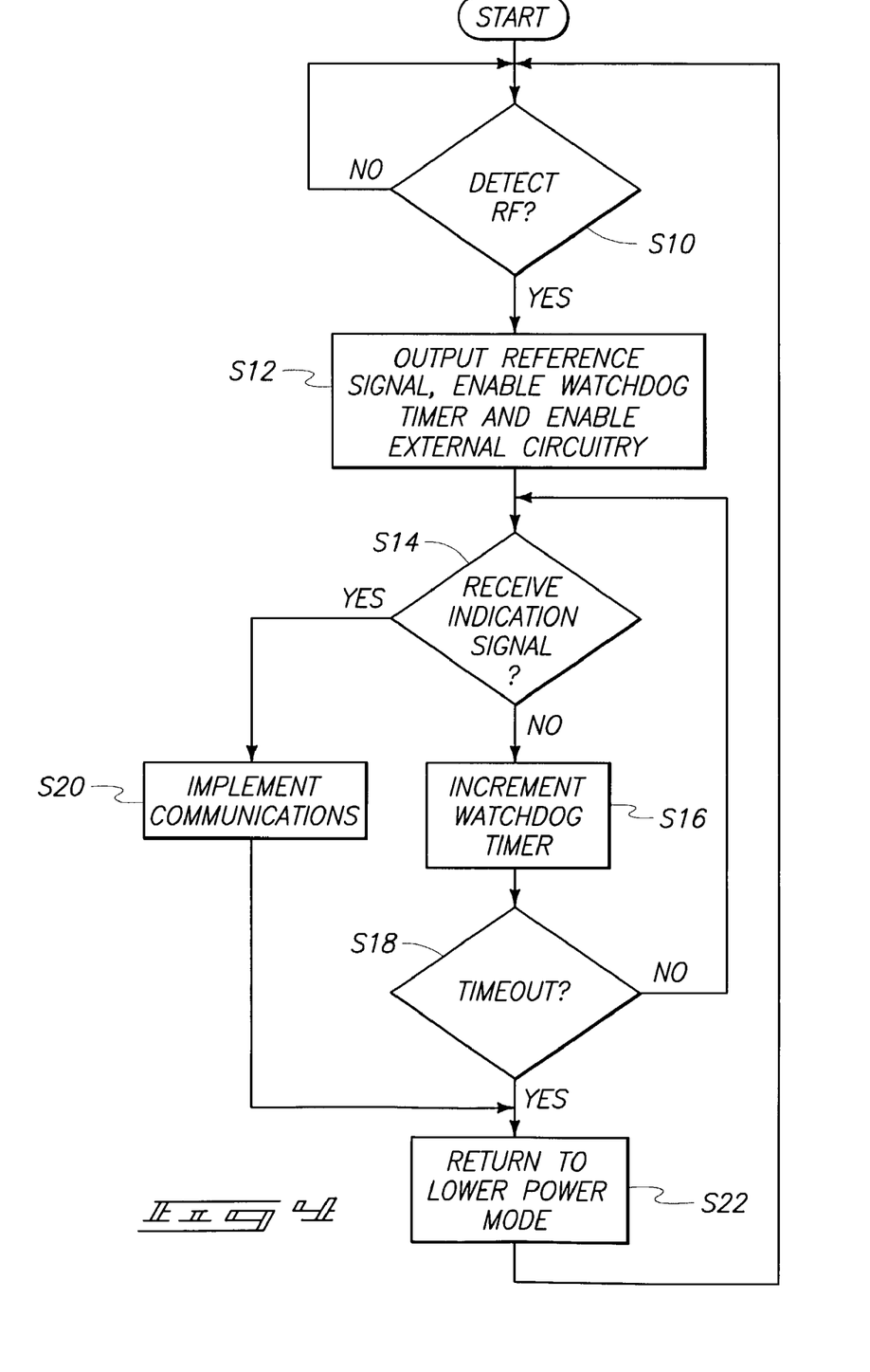
FIG. 4 is a flow chart of an exemplary methodology executable within a wireless communication device of the system.

Referring to FIG. 4, an exemplary methodology executable by processor 38 is illustrated. Other methods are possible which use more, less or alternative steps. The exemplary method commences with operation of processor 38 in the first or sleep mode of operation wherein the consumption of electrical energy by device 14 is minimized.

At a step S10, the processor awaits the reception of an appropriate signal from comparator 40 (e.g., FMO_IN) indicating the detection of radio frequency energy using antenna 30. The processor idles at step S10 or performs other operations until an appropriate signal is received.

At a step S12, and responsive to the detection of appropriate radio frequency energy, the processor enters a second mode of operation and outputs the reference signal, enables an internal watchdog timer, and enables external circuitry, such as the wake-up circuitry.

At a step S14, the processor monitors for the reception of an appropriate indication signal from the wake-up circuitry.

If the condition of step S14 is negative, the processor proceeds to a step S16 to increment the watch dog timer.

At a step S18, the processor determines whether the watch dog timer has timed out. If the condition of step S18 is affirmative, the processor proceeds to a step S22. If the condition of step S18 is negative, the processor returns to step S14 to monitor for the reception of the indication signal.

If the condition of step S14 is affirmative, the processor proceeds to a step S20 to process received wireless signals 18 and to implement communication of wireless signals 20, if appropriate.

Following appropriate communications, or if the condition of step S18 is affirmative, the processor proceeds to step S22 to return to a lower-power operational mode (e.g., sleep mode).

In one arrangement, another watchdog timer may be associated with communications performed in step S20. If the watchdog timer expires during an absence of communications, the processor proceeds to step S22 to enter a lower electrical energy consumption state or mode. The processor then returns to step S10 to monitor for the detection of radio frequency energy for subsequent communications.

Aspects of the invention may extend the useful life of a battery of a wireless communication device 14. According to some aspects, circuitry of the device 14 discriminates signals originating from a reader from spurious signals from microwave ovens, wireless modems, 802.11 wireless networks, "Bluetooth" wireless networks, cellular telephones, or other sources. As described above, an exemplary discrimination method compares frequencies of two periodic waveforms, one of which originates in a reader device and one within the remotely located wireless communication device. If the two waveforms are within a relatively small frequency difference of one another (e.g., 160 Hz for R5=10K and C6=0.1 uF), the wireless communication device validates the source and commences processing of an incoming data stream.

Aspects of the invention reduce the consumption of power in determining whether incident RF energy is from a reader. In one exemplary method, the amount of time that a processor is operating at an increased power mode is reduced to conserve energy. For example, multiple low power states of a processor may be utilized, including one mode wherein a fixed clock frequency is generated as mentioned above to provide discrimination operations.

Wake-up circuitry 34 provides excellent "wake-up" discrimination of signals of device 12 from signals of other RF sources. In addition, the power consumed by circuitry 34 may be minimized by de-energizing such circuitry when not in use. The described exemplary circuitry implements robust rejection of spurious signals while providing significant reductions in power consumed by device 14. In addition, the exemplary circuitry 34 described herein comprises components which may be readily implemented in an Application Specific Integrated Circuit (ASIC) configuration which utilizes a relatively minimal amount of real estate of device 14.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A radio frequency identification device comprising:
    an antenna;
    radio frequency identification device communication circuitry coupled with the antenna and configured to receive a plurality of first wireless communication signals from a reader, to process the first wireless communication signals, and to control the communication of a plurality of second wireless communication signals to the reader responsive to the processing of the first wireless communication signals;
    wake-up circuitry coupled with the antenna and configured to receive electrical energy from the antenna corresponding to radio frequency energy received using the antenna, to analyze the received electrical energy with respect to a reference signal, and to output a wake-up signal to the communication circuitry responsive to the analysis; and
    wherein the reference signal is generated responsive to the reception of the radio frequency energy using the antenna.

2. The device of claim 1 wherein the communication circuitry is configured to output the reference signal responsive to the reception of the radio frequency energy using the antenna.

3. The device of claim 1 wherein the wake-up circuitry is configured to compare a frequency of the received electrical energy with a frequency of the reference signal to perform the analysis.

4. The device of claim 1 wherein the communication circuitry is configured to provide operational electrical energy to the wake-up circuitry responsive to the reception of the radio frequency energy using the antenna.

5. The device of claim 1 wherein the communication circuitry is configured to enter a predefined mode of operation to process the first wireless communication signals responsive to the outputting of the wake-up signal.

6. The device of claim 1 wherein the radio frequency identification device comprises no more than a single receiver.

7. The device of claim 1 wherein the communication circuitry is configured to control the communication of the second wireless communication signals using backscatter modulation.

8. The device of claim 1 further comprising a battery configured to provide operational electrical energy to the communication circuitry and the wake-up circuitry.

9. The device of claim 1 wherein the wake-up circuitry is implemented within an Application Specific Integrated Circuit (ASIC).

10. The device of claim 1 wherein the reference signal is not generated during an absence of the first wireless communication signals at the antenna.

11. A radio frequency identification device comprising:
    an antenna;
    radio frequency identification device communication circuitry coupled with the antenna and configured to receive a plurality of first wireless communication signals from a reader, to process the first wireless communication signals, and to control the communication of a plurality of second wireless communication signals to the reader responsive to the processing of the first wireless communication signals;
    wake-up circuitry coupled with the antenna and configured to receive electrical energy from the antenna corresponding to radio frequency energy received using the antenna, to analyze the received electrical energy with respect to a reference signal, and to output a wake-up signal to the communication circuitry responsive to the analysis; and
    wherein operational electrical energy is applied to the wake-up circuitry responsive to the reception of the radio frequency energy using the antenna and to enable the wake-up circuitry to analyze the received electrical energy.

* * * * *